(12) United States Patent
Muramoto et al.

(10) Patent No.: US 11,026,379 B2
(45) Date of Patent: Jun. 8, 2021

(54) HYDROPONIC CULTIVATION SYSTEM COMPRISING SEEDBEDS AND A TRANSPORT MECHANISM

(71) Applicant: TOYO SEIKAN GROUP HOLDINGS, LTD., Tokyo (JP)

(72) Inventors: Katsuhiro Muramoto, Tokyo (JP); Jun Agari, Tokyo (JP); Mari Nishi, Kudamatsu (JP); Kazuto Yoshimura, Tokyo (JP); Kazuyoshi Nagata, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 245 days.

(21) Appl. No.: 16/310,540

(22) PCT Filed: May 1, 2017

(86) PCT No.: PCT/JP2017/017200
§ 371 (c)(1),
(2) Date: Dec. 17, 2018

(87) PCT Pub. No.: WO2017/217130
PCT Pub. Date: Dec. 21, 2017

(65) Prior Publication Data
US 2019/0183076 A1    Jun. 20, 2019

(30) Foreign Application Priority Data

Jun. 17, 2016 (JP) ............................ JP2016-120846

(51) Int. Cl.
*A01G 31/04* (2006.01)
*A01G 7/04* (2006.01)

(52) U.S. Cl.
CPC .......... *A01G 31/042* (2013.01); *A01G 7/045* (2013.01); *A01G 31/04* (2013.01); *Y02P 60/21* (2015.11)

(58) Field of Classification Search
CPC ...... A01G 31/00; A01G 31/04; A01G 31/042; A01G 31/047; A01G 31/045
See application file for complete search history.

(56) References Cited

U.S. PATENT DOCUMENTS 4,028,847 A * 6/1977 Davis ................... A01G 31/042
47/65
4,166,341 A * 9/1979 Vestergaard ......... A01G 31/042
47/59 R
(Continued)

FOREIGN PATENT DOCUMENTS

JP    S51-84948 U7    7/1976
JP    S53-27535 A     3/1978
(Continued)

OTHER PUBLICATIONS

International Search Report in International Application No. PCT/JP2017/017200, filed May 1, 2017.
(Continued)

*Primary Examiner* — Monica L Barlow
*Assistant Examiner* — Michael A. Fabula
(74) *Attorney, Agent, or Firm* — Saliwanchik, Lloyd & Eisenschenk

(57) ABSTRACT

A hydroponic cultivation system includes a plurality of seedbeds, a hanging part, and a transport mechanism. A plurality of seedlings of a plant to be cultivated is transplanted to side surfaces of the plurality of seedbeds. The hanging part hangs each of the plurality of seedbeds while the plurality of seedbeds is arranged in a predetermined horizontal direction from a planting side of the seedlings to a harvesting side of the seedlings. The transport mechanism
(Continued)

transports the plurality of seedbeds in the predetermined horizontal direction while widening spaces between the seedbeds in the predetermined horizontal direction in a stepwise or continuous manner.

5 Claims, 10 Drawing Sheets

(56) References Cited

U.S. PATENT DOCUMENTS

| | | | |
|---|---|---|---|
| 4,216,617 A * | 8/1980 | Schmidt | A01G 31/06 47/62 A |
| 4,216,618 A | 8/1980 | Haub et al. | |
| 4,337,986 A * | 7/1982 | Haub | A01G 31/042 384/456 |
| 4,476,651 A * | 10/1984 | Drury | A01G 31/042 47/65 |
| 4,527,484 A * | 7/1985 | Veith | B61B 12/02 104/89 |
| 6,173,529 B1 * | 1/2001 | Kertz | A01G 31/06 47/65.8 |
| 9,591,814 B2 * | 3/2017 | Collins | A01G 31/02 |
| 10,306,847 B2 * | 6/2019 | Whitcher | A01G 31/045 |
| 10,765,074 B2 * | 9/2020 | Deforche | A01G 31/042 |
| 2006/0162252 A1 * | 7/2006 | Lim | A01G 31/045 47/59 R |
| 2006/0201058 A1 | 9/2006 | Ripatti | |
| 2014/0000162 A1 * | 1/2014 | Blank | A01G 31/06 47/62 A |
| 2015/0223418 A1 | 8/2015 | Collins et al. | |
| 2017/0027119 A1 * | 2/2017 | Storey | A01G 31/04 |
| 2019/0029200 A1 * | 1/2019 | Mawendra | A01G 20/30 |

FOREIGN PATENT DOCUMENTS

| | | |
|---|---|---|
| JP | 1988-60971 B2 | 11/1988 |
| JP | 3-91423 A | 4/1991 |
| JP | H03-127919 A | 5/1991 |
| JP | 1993-11924 B2 | 2/1993 |
| JP | H05-76252 A | 3/1993 |
| JP | H06-276869 A | 10/1994 |
| JP | 2000-077499 A | 3/2000 |
| JP | 2002-157641 A | 5/2002 |
| JP | 2008-154505 A | 7/2008 |

OTHER PUBLICATIONS

Office Action dated Jun. 9, 2020 in Japanese Application No. 2016-120846, along with its English translation.
Office Action dated Jul. 24, 2020 in European Application No. 17813035.7.
Supplementary European Search Report dated Nov. 11, 2019 in European Application No. 17813035.7.

* cited by examiner

HYDROPONIC CULTIVATION SYSTEM COMPRISING SEEDBEDS AND A TRANSPORT MECHANISM

CROSS-REFERENCE TO RELATED APPLICATIONS

This application is the U.S. national stage application of International Patent Application No. PCT/JP2017/017200, filed May 1, 2017, which claims the benefit under 35 U.S.C. § 119 of Japanese Application No. 2016-120846, filed Jun. 17, 2016, the disclosures of each of which are incorporated herein by reference in their entirety.

TECHNICAL FIELD

The present invention relates to a hydroponic cultivation system.

BACKGROUND ART

In the past, a hydroponic cultivation system for cultivating plants such as vegetables indoors using nutrient cultivation has been put to practical use. Among such hydroponic cultivation systems, there is one including a mechanism capable of widening pitches between a plurality of seedbeds, to which a plant to be cultivated is transplanted, according to the growth of a plant while moving the seedbeds from a planting side to a harvesting side.

For example, the following Patent Literature 1 discloses that in a hydroponic cultivation facility including a plurality of troughs for causing a nutrient solution to flow to the bottom, which are arranged on one surface in parallel, the troughs are simultaneously transported by driving a pitch gradually increasing type transport apparatus in which the pitch is gradually increased from the starting end side to the terminal side of the trough column.

Further, in the following Patent Literature 2, a plant growing apparatus including a device that increases spaces of a plurality of troughs, which are arranged to be inclined in a plurality of planes substantially perpendicular to one horizontal direction, in the horizontal direction as the plant matures, and advances the troughs is disclosed.

CITATION LIST

Patent Literature

Patent Literature 1: Japanese Examined Patent Publication No. 1993-11924
Patent Literature 2: Japanese Examined Patent Publication No. 1988-60971

DISCLOSURE OF INVENTION

Technical Problem

However, in the technologies described in the above-mentioned Patent Literatures 1 and 2, since each of the troughs to which a plurality of seedlings are transplanted is configured to expand in a direction perpendicular to its moving direction in the horizontal plane, the transport apparatus of each trough has no choice but to have a complicated mechanism including a plurality of screws.

In view of the circumstances as described above, it is an object of the present invention to provide a hydroponic cultivation system capable of transporting seedbeds with a simple mechanism.

Solution to Problem

In order to achieve the above-mentioned object, a hydroponic cultivation system according to an embodiment of the present invention includes a plurality of seedbeds, a hanging part, and a transport mechanism. The plurality of seedbeds are long seedbeds to which seedlings of a plant are transplanted. The hanging part hangs each of the plurality of seedbeds while the plurality of seedbeds are arranged in a predetermined horizontal direction from a planting side of the seedlings to a harvesting side of the seedlings. The transport mechanism transports the plurality of seedbeds in the predetermined horizontal direction while widening spaces between the seedbeds in the predetermined horizontal direction in a stepwise or continuous manner.

Accordingly, the hydroponic cultivation system is capable of transporting the seedbeds with a simple mechanism by the transport mechanism horizontally transporting the vertical seedbeds, which are hanged by the hanging part and arranged in a predetermined horizontal direction, as compared with the case of using horizontal seedbeds. Further, in the hydroponic cultivation system, since the hanging part hangs the seedbeds, the transport mechanism is not subjected to the weight of the seedbeds. Therefore, it is possible to simplify the structure of the transport mechanism and reduce the cost.

Each of the seedbed or the transport mechanism may include a sliding mechanism that slides the seedbed in the predetermined horizontal direction at a time of transporting the seedbed.

Accordingly, the hydroponic cultivation system is capable of smoothly transporting each seedbed and inhibiting each seedbed from being worn and broken.

The transport mechanism may include one screw formed to have a pitch that is increased in a stepwise manner toward the predetermined horizontal direction, the screw including grooves, upper ends of the seedbeds being capable of engaging with the grooves.

Accordingly, the hydroponic cultivation system is capable of transporting each seedbed with one screw, and it is possible to simplify the system.

End portions of ridges of the screw on the planting side may include cutouts that are capable of slidably inserting upper ends of a predetermined number of seedbeds to be newly planted in the predetermined horizontal direction collectively and causing the seedbeds to engage with the grooves.

Accordingly, since the screw includes a cutout, the hydroponic cultivation system is capable of causing a worker to simultaneously insert a predetermined number of seedbeds into the screw. Therefore, it is possible to make the planting work more efficient. Here, examples of the predetermined number includes, but not limited to, 3, 5, and 10.

The seedbeds may each include a roller member that slides, on the hanging part in the predetermined horizontal direction, the corresponding seedbed to a position hanged by the hanging part at the time of transporting the seedbed. In this case, the roller member may have a width in the predetermined horizontal direction, the width matching a pitch of an end portion of the screw on the planting side.

Accordingly, since the width of the roller member and the pitch of the screw matches, the hydroponic cultivation system is capable of positioning, in the case where the predetermined number of seedbeds are slidably inserted from the cutout, each seedbed in the groove of the screw, and omitting unnecessary work for adjusting the position of the seedbed to smoothly transport the seedbed in the horizontal direction as it is.

Ridges and grooves of a part of the screw in which the cutouts are provided may include a stationary part that regulates transport of the seedbeds in the predetermined horizontal direction and guides the seedbeds in a direction parallel to a rotation direction of the screw.

Accordingly, the hydroponic cultivation system is capable of inhibiting each seedbed inserted via the cutout from being damaged by coming into contact with the corner of the cutout when the seedbed is moved with the rotation of the screw, and inhibiting the damaged piece from falling onto the plant, i.e., the plant from being mixed with a foreign matter.

The screw may include a plurality of screw members each having a predetermined length and connection members each connecting two screw members, connection holes being formed at both end portions of the screw members in a rotation axis direction of the screw, the connection members each engaging with the corresponding connection holes of the plurality of screw members. In this case, the transport mechanism may include a screw supporting part that rotatably supports an end portion of the screw and a biasing member that is provided between the screw supporting part and the screw and biases the screw members in the rotation axis direction.

Accordingly, since the biasing member biases the screw including the plurality of connected screw members, the hydroponic cultivation system is capable of maintaining the position of each screw member even in the case where the screw is expanded and contracted due to heat and the total length thereof is changed. In this case, the connection hole and the connection member may each have, for example, a shape obtained by combining a cylinder and a semicylinder having a smaller diameter than the cylinder.

The hydroponic cultivation system may further include a nutrient solution supply unit that is provided at the same position as that of the transport mechanism in a height direction or at a position lower than that and supplies a nutrient solution to each of the seedbeds.

Accordingly, since the hydroponic cultivation system includes the nutrient supply pipe at the same position as that of the transport mechanism in the height direction or at a position lower than that, the transport mechanism is not exposed to the nutrient solution and corroded. Therefore, it is possible to improve the durability.

The seedbeds may each include a nutrient receiving pipe that is provided to protrude in a vertical direction of a longitudinal direction of the seedbed from a side surface of the seedbed, receives, from above, a nutrient solution supplied from the nutrient solution supply unit, and causes the nutrient solution to flow in the seedbed.

Accordingly, in the hydroponic cultivation system, the nutrient solution receiving unit perpendicular to the seedbed causes the nutrient solution supplied from the nutrient solution supply unit to flow to the seedbed to generate vortex flow inside the nutrient solution receiving unit, which makes it possible to spread the nutrient solution to each seedling inside the seedbed.

The nutrient solution supply unit may supply nutrient solutions different for each region of the seedbeds.

Accordingly, the hydroponic cultivation system is capable of supplying nutrient solutions having different components and concentrations according to the growth of the plant, and easily cultivating functional vegetables such as low potassium lettuce by, for example, replacing the previous nutrient solution with a nutrient solution having different components at a predetermined growth stage. Further, since the nutrient solution flows in the vertical direction at high speed in the seedbed, even in the case where different nutrient solutions are used for each region, the contamination of the nutrient solutions is suppressed as much as possible, and it is possible to maximize the effect of making the nutrient solution different for each region as compared with the case of using a horizontal seedbed.

The hydroponic cultivation system may further include a guide member that regulates swaying of each of the seedbeds on a plane vertical to the predetermined horizontal direction.

Accordingly, the hydroponic cultivation system is capable of inhibiting the seedbed from swaying on the plane vertical to the transport direction during transport or the like, suppressing the uneven growth of the plant, and inhibiting the plant from being damaged.

Advantageous Effects of Invention

As described above, according to the present invention, it is possible to provide a hydroponic cultivation system capable of transporting seedbeds with a simple mechanism. However, this effect does not limit the present invention.

MODE(S) FOR CARRYING OUT THE INVENTION

Hereinafter, an embodiment of the present invention will be described with reference to the drawings.

[Configuration of System]

Figure 1:
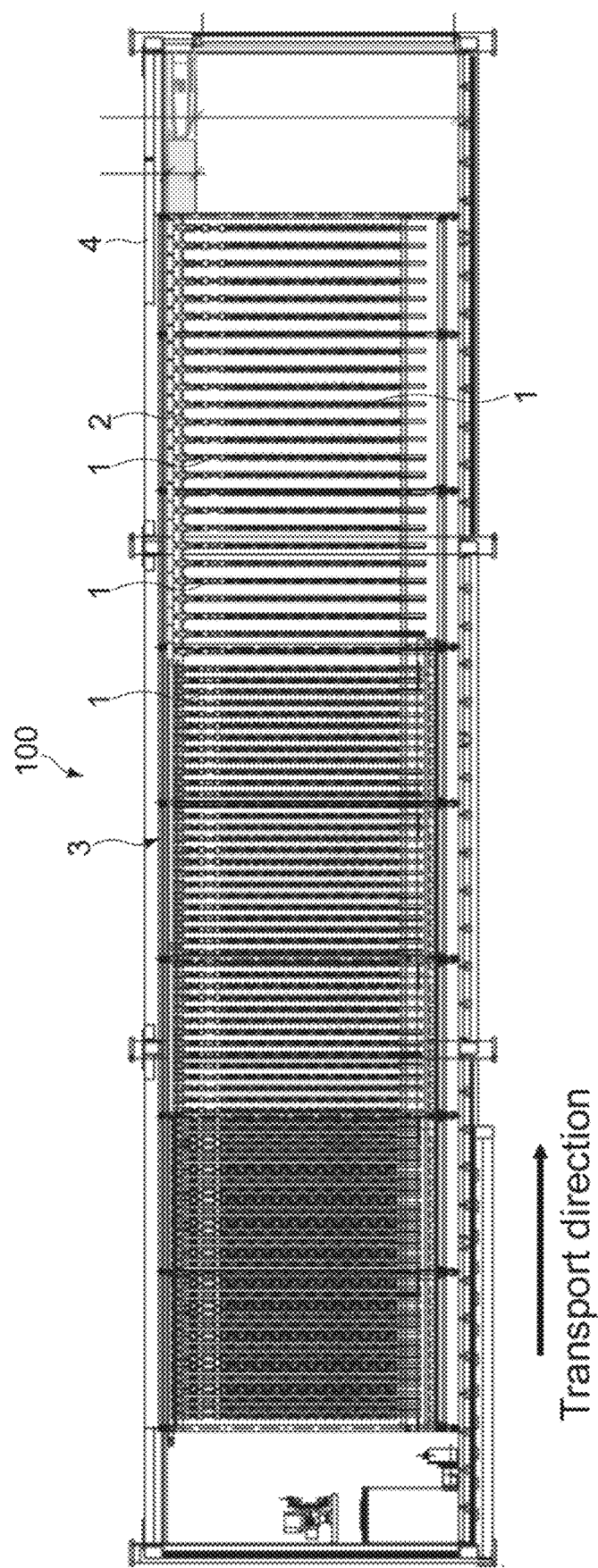
FIG. 1 is a schematic diagram showing a configuration of the entire hydroponic cultivation system according to an embodiment of the present invention.
Figure 2:
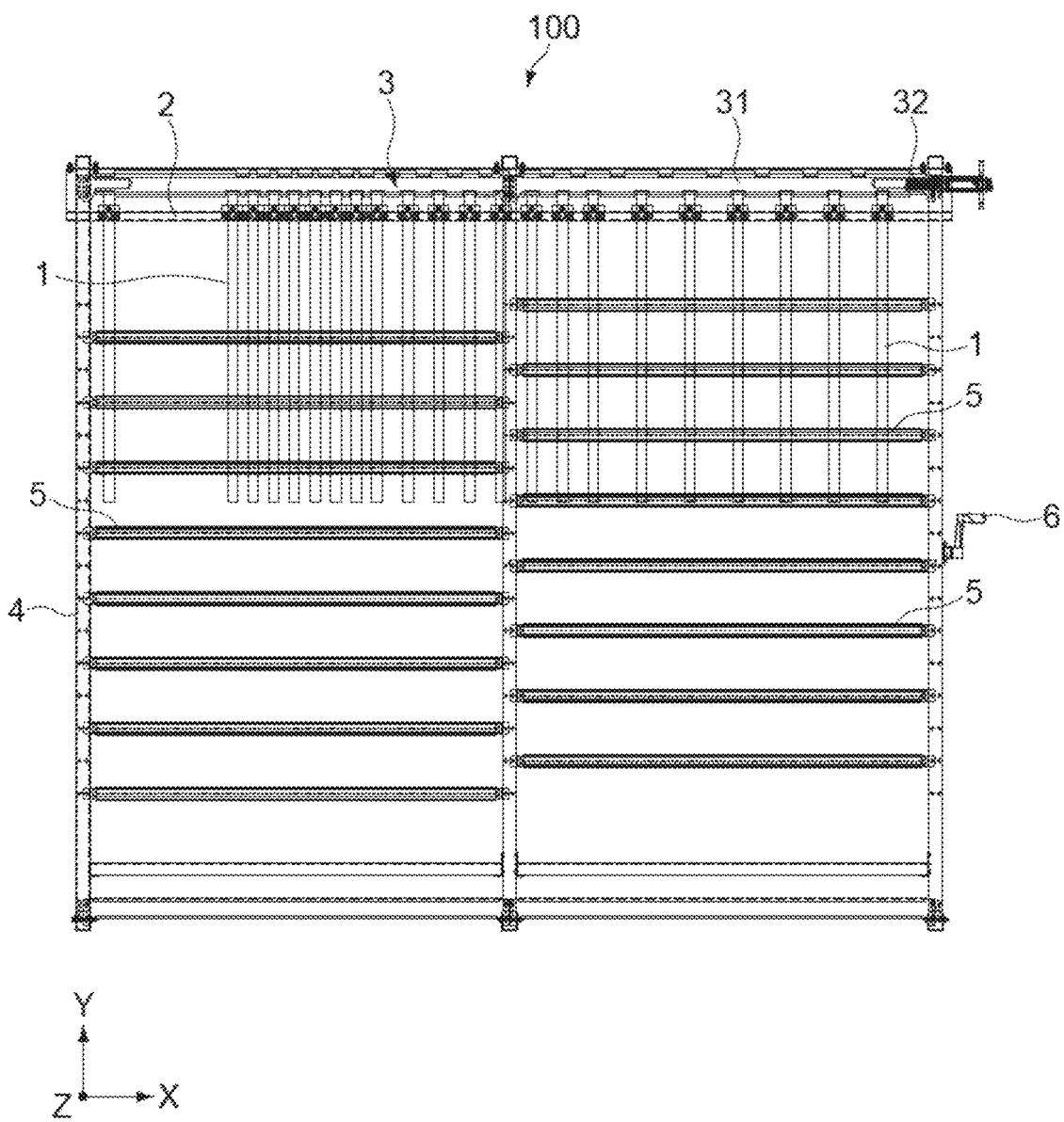
FIG. 2 is a schematic diagram of the hydroponic cultivation system shown in FIG. 1.
Figure 3:
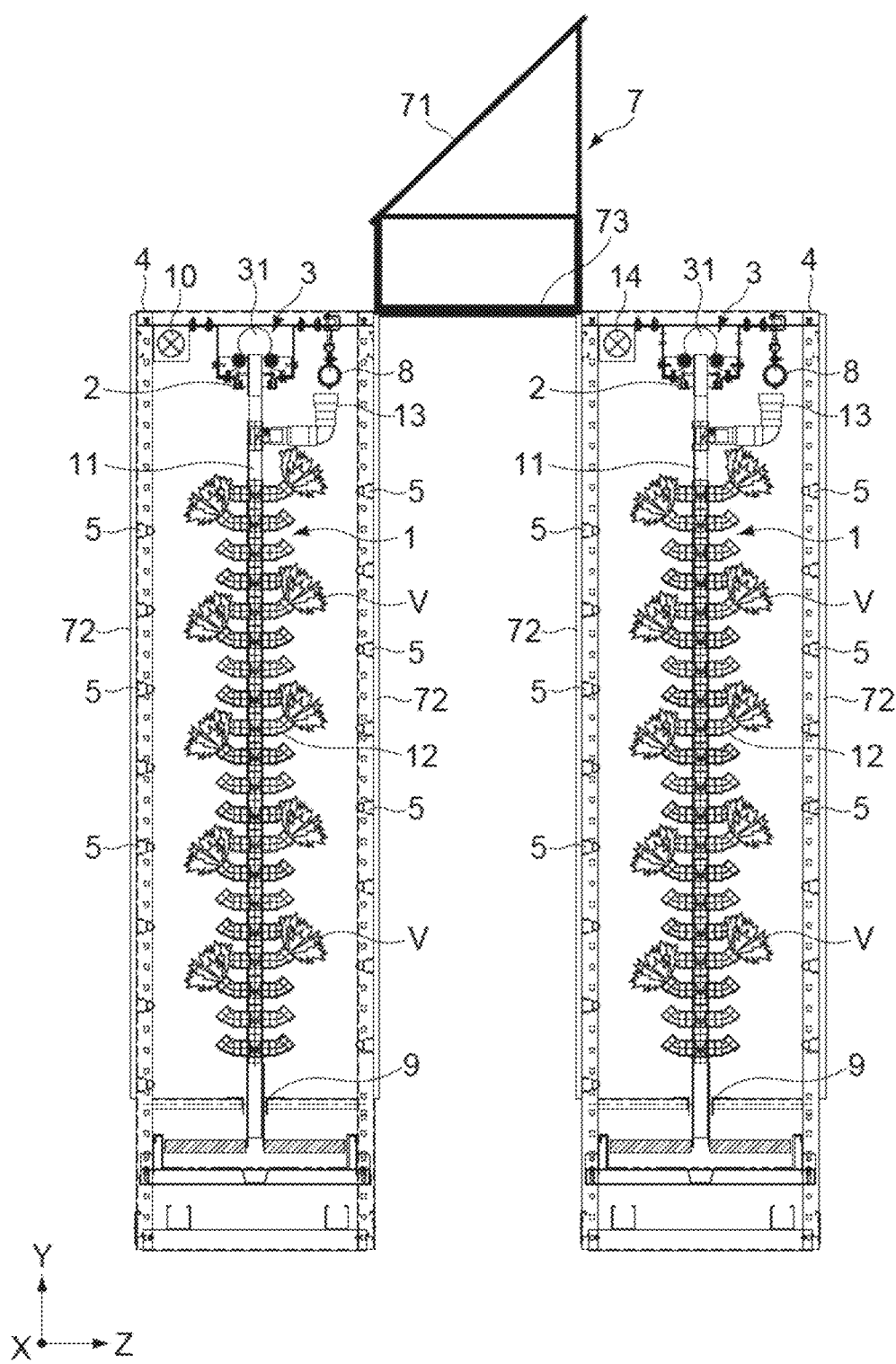
FIG. 3 is a diagram showing the hydroponic cultivation system shown in FIG. 2 from the transport direction.

FIG. 1 is a diagram showing a configuration of the entire hydroponic cultivation system according to this embodiment. Further, FIG. 2 is a partially enlarged view of the hydroponic cultivation system shown in FIG. 1. Further, FIG. 3 is a diagram showing the hydroponic cultivation system shown in FIG. 2 from the transport direction.

This hydroponic cultivation system is a system for cultivating plants such as leafy vegetables including lettuce, green leaf, Boston lettuce, mizuna (Japanese mustard greens), spinach, and herbs.

As shown in these figures, a hydroponic cultivation system 100 includes a plurality of cultivation cylinders 1, a cultivation cylinder hanging part 2 that hangs each of the cultivation cylinders 1, and a transport mechanism 3 that transports each of the cultivation cylinders 1 in a predetermined horizontal direction (X direction in the figure). The cultivation cylinder hanging part 2 and the transport mechanism 3 are supported by a strut frame 4.

Each of the cultivation cylinders 1 is a hollow cylindrical seedbed, and a seedling V of the above-mentioned leafy vegetable to be cultivated is transplanted on the side surface of the seedbed. As the material of the cultivation cylinders 1, for example, polyvinyl chloride or the like is used.

The cultivation cylinder hanging part 2 includes, for example, a rail along the X direction having a slit for inserting the cultivation cylinder 1 in the center thereof, and hangs the cultivation cylinder 1 while the cultivation cylinders are arranged in a predetermined horizontal direction (X direction) from a planting side (left side of FIG. 1 and FIG. 2) to a harvesting side (right side of FIG. 1 and FIG. 2) of the seedling V. That is, each of the cultivation cylinders 1 is hanged in one column while the longitudinal direction is the vertical direction (Y direction).

A plurality of cultivation units each including the plurality of cultivation cylinders 1 hanged in one column, the cultivation cylinder hanging part 2, and the transport mechanism 3 are placed in the vertical direction (Z direction) of the transport direction. Although only two cultivation units are shown in FIG. 3, it goes without saying that three or more cultivation units may be placed.

As shown in FIG. 3, each of the cultivation cylinders 1 includes a cultivation cylinder main body 11, and planting branch pipes 12 that are each branched from the cultivation cylinder main body 11 via a joint pipe or the like and each hang the transplanted seedling V. Note that in FIG. 2, only the upper part and the cultivation cylinder main body 11 of each of the cultivation cylinders 1 are shown in a simplified manner. Further, in FIG. 3, two cultivation cylinders 1 are shown to be overlapped with each other. The cultivation cylinders 1 on the front side and (the planting branch pipes 12 of) the cultivation cylinders 1 on the rear side (adjacent in the X direction) are respectively indicated by a bold line and a thin line.

As shown in the figure, the planting branch pipes 12 are alternately arranged at positions facing each other on the side surface of the cultivation cylinder main body 11 toward the longitudinal direction of the cultivation cylinder 1. Further, as shown by the cultivation cylinders 1 on the front side indicated by a bold line and the cultivation cylinders 1 on the rear side indicated by a thin line, the adjacent cultivation cylinders 1 are arranged so that the positions of the planting branch pipes 12 thereof are alternately arranged in the transport direction (X direction) (the planting branch pipes 12 are not adjacent to each other in the adjacent cultivation cylinders 1). Accordingly, it is possible to inhibit the seedlings V from coming into contact with each other and improve the use efficiency of the cultivation space while arranging the plurality of cultivation cylinders 1 at a high density in the cultivation system 100.

Each of the planting branch pipes 12 is bent and formed so that the angle formed by the planting branch pipe 12 and the cultivation cylinder main body 11 in the YZ plane is approximately 90 degrees at the part just behind branching of the planting branch pipes 12 and 45 degrees at the remaining part. Therefore, the planting angle of the seedling V is approximately 45 degrees. However, the planting angle is not limited thereto.

Further, the angle formed by the planting branch pipe 12 and the cultivation cylinder main body 11 in the XY plane (angle of the planting branch pipe 12 with respect to the transport direction) is approximately 90 degrees. However, each of the cultivation cylinders 1 may be rotated by, for example, an angle of 45 degrees or less around the longitudinal direction thereof from the state shown in the figure.

In this embodiment, as a light source for growing the seedling V of the cultivation cylinder 1, a daylighting apparatus 7 that takes natural light (sunlight) and applies the light to the seedling V and an LED 5 that applies artificial light to the seedling V are combined. However, as the light source, only natural light or only artificial light may be used.

As the daylighting apparatus 7, a light duct, a skylight, or the like may be used. In addition, the daylighting apparatus 7 may include a solar tracking device, a lover, and the like. Further, as the artificial light source, a fluorescent light, an organic light emitting diode (OLED), or the like may be used instead of the LED 5.

As shown in FIG. 3, the daylighting apparatus 7 includes a daylighting port 71 that takes natural light, a pair of acrylic plates 72 facing in the horizontal direction, and a diffusion plate 73 provided between the daylighting port 71 and the acrylic plates 72.

The shape of each of the acrylic plates 72 is not limited to a plate shape, and various shape such as a film shape are adopted. Further, in the case of using natural light as a light source, the material of the acrylic plates 72 may be a material that allows light to be transmitted therethrough but does not allow heat to pass therethrough, and a material that reflects light such as silver, silver alloy, aluminum, and steel plate may be used. In the case of using the material that reflects light, it is necessary to provide a plurality of holes in the plate according to the position of the seedling V in order to apply light to the seedling V. This makes the natural light taken by the daylighting port 71 propagate downward while being repeatedly reflected. In the propagation process, the light is applied to the seedling V from the hole provided in the plate. Further, in the case where the light source is only an artificial light source, it is better to use a material that scatters light (e.g., plate to which a metal or light scattering film is attached) or a material that reflects light in the cultivation space without leaking the light from the cultivation space (e.g., metal such as silver and aluminum, and resin such as acrylic colored in white or the like) so that the light is surely applied to the plant (shadow is not cast on the plant).

Sunlight taken by the daylighting port 71 is diffused by the diffusion plate 73, emitted from the surface of the acrylic plate 72 on the side of the seedling while being repeatedly reflected between the acrylic plates 72, and applied to the seedling V of the cultivation cylinder 1.

Further, the LED 5 includes, for example, a plurality of horizontally long units as shown in FIG. 2, and is provided on the surface of the acrylic plates 72 on the side of the seedling as shown in FIG. 3. The LED 5 plays, in the case where light to be applied to the seedling V does not reach a predetermined target value with only sunlight, for example, a role of supplementing the sunlight. The light supplement by the LED 5 is performed in parallel with application of sunlight by the daylighting apparatus 7 and also at night when no sunlight is applied.

Further, each of the cultivation cylinders 1 is formed of a material such as polyvinyl chloride as described above. However, the cultivation cylinder 1 may be formed of metal or another kind of resin. In this case, the cultivation cylinder 1 favorably has high reflectance (e.g., not less than 70%) with respect to the natural light or artificial light (is favorably colored with a silver-based color or a white-based color). Accordingly, it is possible to effectively utilize reflected light of the light applied from the daylighting apparatus 7 and the LED 5 to each of the cultivation cylinders 1 for promoting the growth of the seedling V.

As shown in FIG. 1 to FIG. 3, the transport mechanism 3 includes one screw 31 for transporting the cultivation cylinders 1 of one line in the X direction. As will be described in detail later, the screw 31 is formed such that the pitch thereof is increased in a stepwise manner toward the transport direction, and includes a groove with which the upper end of each of the cultivation cylinders 1 can engage. Accordingly, as shown in FIG. 1 and FIG. 2, the transport mechanism 3 is capable of transporting each of the cultivation cylinders 1 while widening spaces between the cultivation cylinders 1 in a stepwise or continuous manner toward the transport direction (X direction).

The screw 31 can be rotationally driven by, for example, a motor or the like (not shown). Alternatively, the screw 31 may be manually driven by a worker using a handle 6 shown in FIG. 2. Details of the screw 31 will be described later.

As shown in FIG. 3, a nutrient supply pipe 8 for supplying a nutrient solution (liquid fertilizer obtained by dissolving solid or liquid fertilizer in water) to each of the cultivation cylinders 1 is provided on the upper part of the cultivation cylinder 1. The nutrient solution flows in the nutrient supply pipe 8 from a nutrient solution tank (not shown) by a pump (not shown), is supplied to the reception port of a nutrient receiving pipe 13 of the cultivation cylinder 1, and is distributed to the root of the seedling V inside the cultivation cylinder via the nutrient receiving pipe 13.

Here, the nutrient supply pipe 8 is provided at the same position as that of the transport mechanism 3 in the height direction (Y direction) or at a position lower than that. Accordingly, since the transport mechanism 3 is not exposed to the nutrient solution and corroded, it is possible to improve the durability.

Further, the nutrient receiving pipe 13 is provided so as to protrude in the vertical direction of the longitudinal direction of each of the cultivation cylinders 1 (horizontal direction) from the side surface of the cultivation cylinder 1, and receives, from the reception port at the end thereof, the nutrient solution supplied from the nutrient supply pipe 8. Accordingly, the nutrient solution flowing in from the reception port collides with the nutrient receiving pipe 13 in the horizontal direction to generate vortex flow inside the nutrient receiving pipe 13, and the nutrient solution flows in the cultivation cylinder main body 11 like a whirlpool, which makes it possible to spread the nutrient solution to each seedling V.

Further, at the position corresponding to the end of the lower part of each of the cultivation cylinders 1, a cultivation cylinder bottom guide 9 for regulating the swing of each of the cultivation cylinders 1 on the plane (YZ plane) perpendicular to the transport direction is provided, for example, between strut frames facing each other with the cultivation cylinders 1 disposed therebetween. Accordingly, it is possible to inhibit the cultivation cylinders 1 from swaying on the plane vertical to the transport direction during transport or the like, suppress the uneven growth of the seedling V, and inhibit the seedling V from being damaged.

Further, the hydroponic cultivation system 100 includes an air conditioning apparatus (not shown), and the air supplied from this air conditioning apparatus ejected downward from an air conditioning duct 10 provided in the vicinity of the transport mechanism 3 of the upper part of the strut frame 4. Further, separately from the air, also carbon dioxide used for photosynthesis by the seedling V is supplied to the inside of the hydroponic cultivation system 100. This carbon dioxide is mixed with the above-mentioned air and filled in the cultivation space. Further, since the cultivation space is covered with the acrylic plates 72, also the air conditioning efficiency is improved.

In addition, although not shown, the hydroponic cultivation system 100 includes a control apparatus that controls the driving state of the LED 5 and the supply state of the nutrient solution from the liquid fertilizer pump, and the like.

[Configurations of Transport Mechanism and Sliding Mechanism]

Next, the transport mechanism 3 and a sliding mechanism assisting the transport mechanism 3 will be described.

Figure 4:
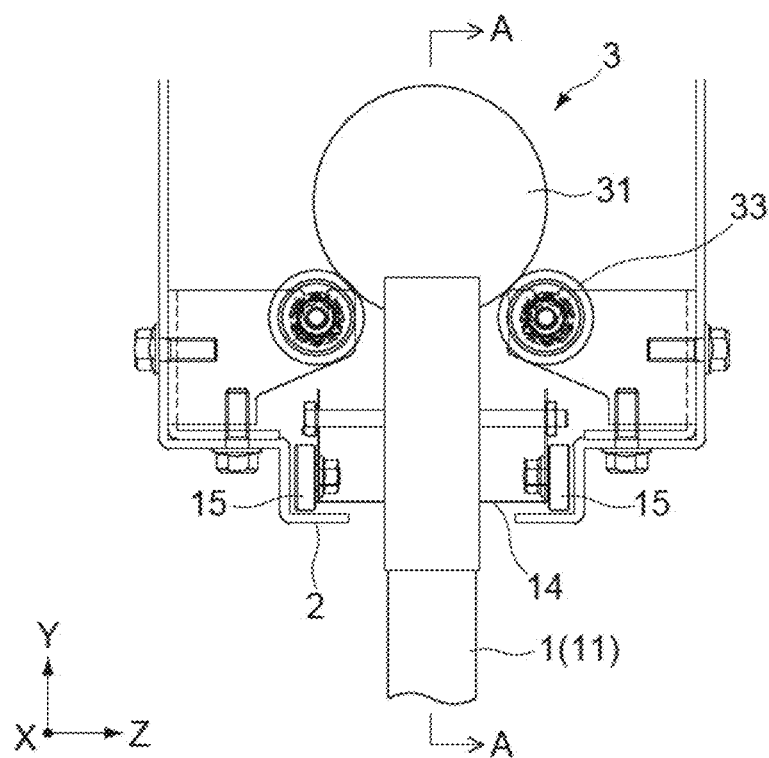
FIG. 4 is an enlarged view of a transport mechanism part of the hydroponic cultivation system shown in FIG. 3.

FIG. 4 is an enlarged view of the transport mechanism 3 part of the hydroponic cultivation system 100 shown in FIG. 3. Further, FIG. 5 is a diagram showing the transport mechanism 3 shown in FIG. 4 from the side surface direction.

As shown in the figures, at the position of the upper part of each of the cultivation cylinders 1 at which the cultivation cylinder 1 is hanged by the cultivation cylinder hanging part 2, a pair of roller members 15 is provided via a horizontal frame member 14 connected to the main body 11 of the cultivation cylinder 1.

The roller members 15 are rotatable by an axis in the Z direction in the figure. By being supported by the cultivation cylinder hanging part 2, the roller members 15 function as a sliding mechanism that slides each of the cultivation cylinders 1 on the cultivation cylinder hanging part 2 in the transport direction (X direction) at the time of transportation of the cultivation cylinder 1 by the screw 31 of the transport mechanism 3. With the sliding mechanism, it is possible to more smoothly transport each of the cultivation cylinders 1 and inhibit the cultivation cylinder 1 from being worn and damaged.

Figure 5:
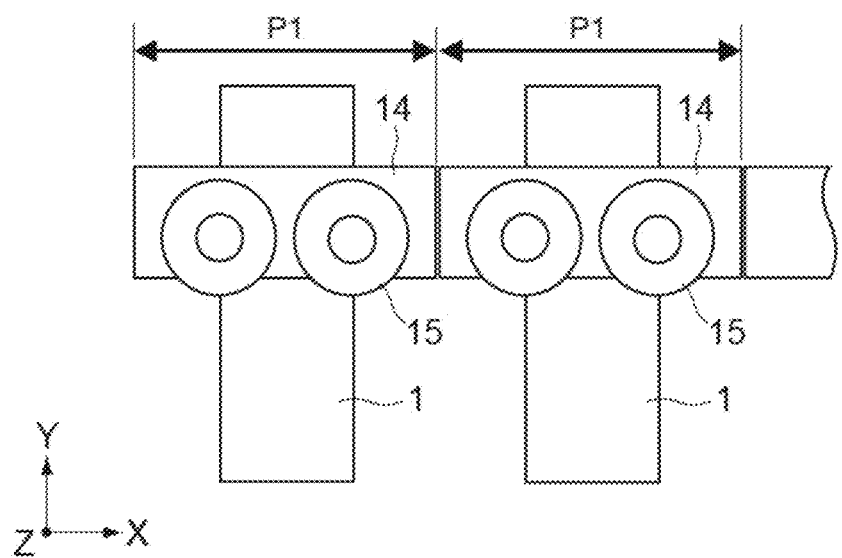
FIG. 5 is a diagram showing the transport mechanism shown in FIG. 4 from the side direction.

As shown in FIG. 5, in each of the cultivation cylinders 1, the width (length) in the transport direction of the roller members 15 and the horizontal frame member 14 holding the roller members 15 matches with a pitch P1 at the end of the screw 31 on the planting side. Accordingly, when performing planting work by newly engaging each of the cultivation cylinders 1 with the screw 31 on the planting side, it is possible to easily position the cultivation cylinder 1 on the screw 31.

Further, as shown in FIG. 4, the screw 31 is guided by a screw guide 33 including a roller or the like at the time of rotational driving.

Figure 6:
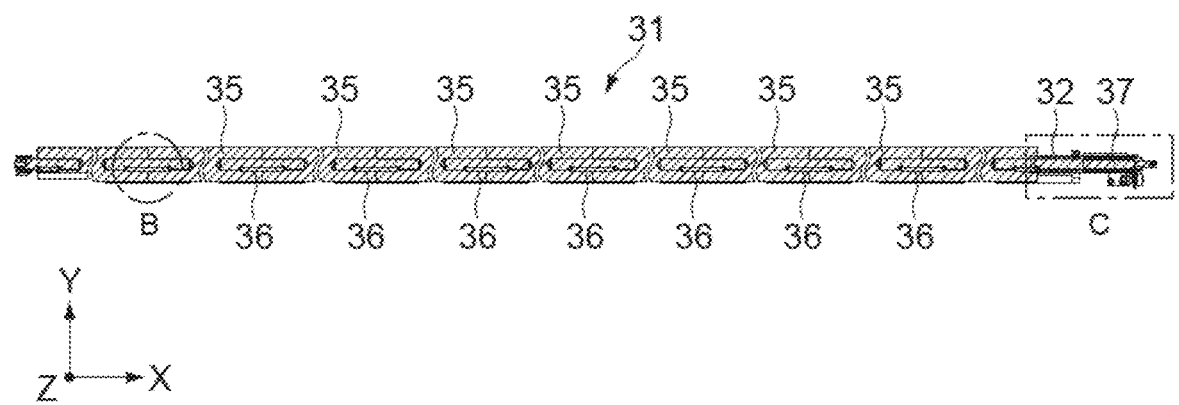
FIG. 6 is a cross-sectional view of the screw of the transport mechanism shown in FIG. 4 taken along the line A-A.
Figure 7:
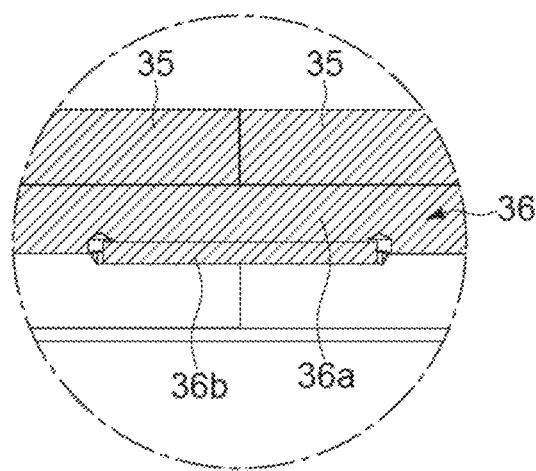
FIG. 7 is an enlarged view of a B part of FIG. 6.
Figure 8:
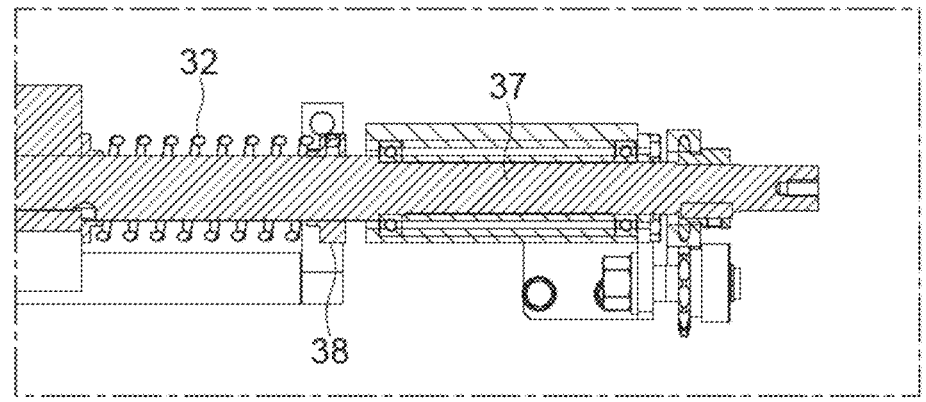
FIG. 8 is an enlarged view of a C part of FIG. 6.

FIG. 6 is a partially omitted cross-sectional view of the screw 31 of the transport mechanism 3 shown in FIG. 4 taken along the line A-A. Further, FIG. 7 is an enlarged view of the B part of FIG. 6, and FIG. 8 is an enlarged view of the C part of FIG. 6.

As shown in these figures, a plurality of (e.g., approximately 10) screw members 35 having a predetermined length (e.g., approximately 1200 mm) are connected to each other by connection keys 36, thereby configuring the screw 31.

Figure 10:
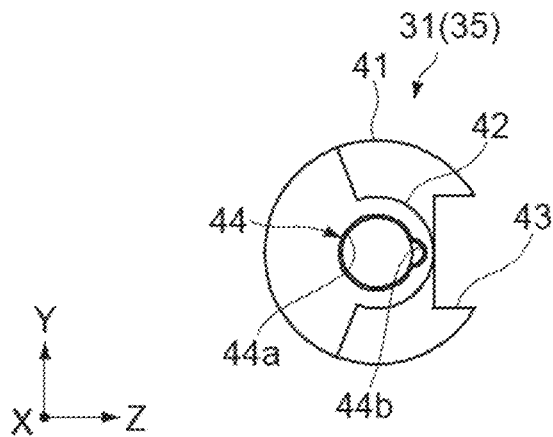
FIG. 10 is a diagram of the screw member shown in FIG. 9 from the rotation axis direction.

Each of the screw members 35 has connection holes (see connection holes 44 (large diameter portion 44a and a small diameter portion 44b) in FIG. 10) in the rotation axis direction at both end portions, and the connection keys 36 each have a substantially cylindrical shape engaging with the connection hole. Specifically, a cylindrical key teeth 36b having a diameter smaller than that of a cylindrical key main body 36a is formed to protrude on the surface of the key main body 36a, thereby configuring the connection key 36.

The screw 31 is for transporting each of the cultivation cylinders 1 in the transport direction one pitch at a time, and the torque thereof is relatively small. Therefore, even in the case where the connection key 36 and the connection hole each have a cylindrical shape, the connection strength thereof can be sufficiently maintained. Further, by making the screw 31 into a cylindrical shape, it is possible to significantly reduce the labor and cost of processing as compared with the case of making the screw 31 into a prismatic shape.

Further, as shown in FIG. 8, the end portion of a screw shaft 37 of the screw 31 is rotatably supported by a screw bearing 38, and a coil spring 32 as a biasing member that biases each of the screw members 35 in the rotation axis direction (X direction) of the screw 31 is provided between the screw bearing 38 and the screw 31.

With the coil spring 32, the connection force of the screw members 35 is maintained, and the position of each of the screw members 35 can be maintained at a predetermined position even in the case where the screw 31 is expanded and contracted due to heat and the total length thereof is changed.

Figure 9:
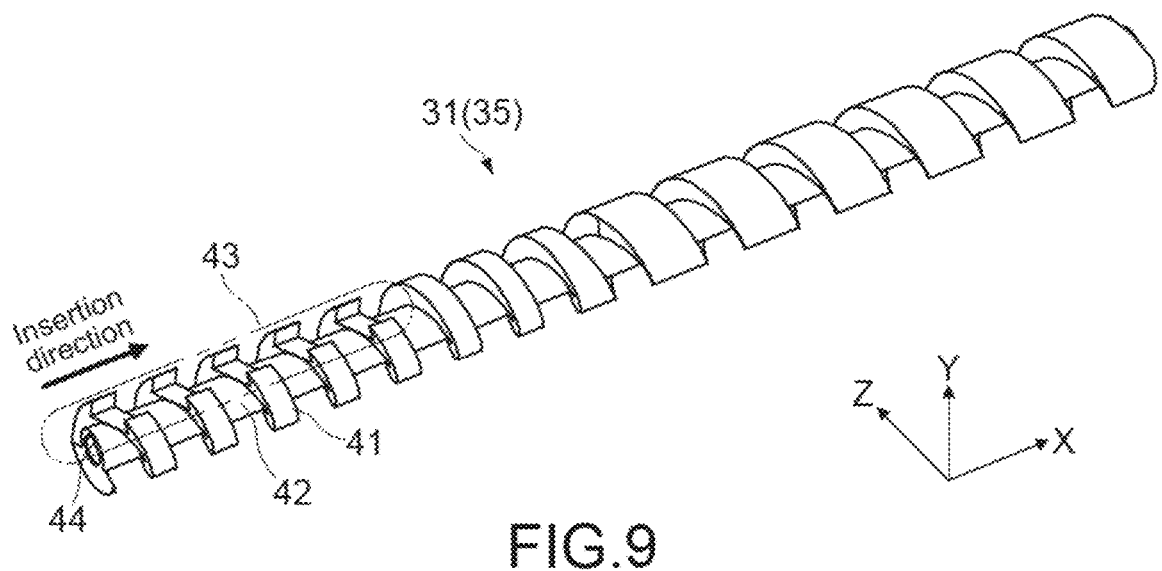
FIG. 9 is a perspective view of a bottom part of the screw member constituting the screw shown in FIG. 6.

FIG. 9 is a perspective view of the bottom part of the screw members 35 shown in FIG. 6 (i.e., perspective view of the screw members 35 viewed upside down). Further, FIG. 10 is a diagram of the screw members 35 shown in FIG. 9 from the rotation axis direction. Further, FIG. 11 is a partially enlarged side view of the screw members 35 shown in FIG. 9.

As shown in the figures, cutouts 43 each having a rectangular parallelepiped shape are formed at end portions of ridges 41 of the screw members 35 on the planting side. The cutouts 43 allow the upper ends of a predetermined number of cultivation cylinders 1 to be newly planted to be slidably inserted in the transport direction collectively, and to engage with grooves 42.

Since the cutouts 43 allows the worker to simultaneously insert the predetermined number of cultivation cylinders 1 into the screw 31 in the insertion direction shown in FIG. 9 at the time of new planting, it is possible to make the planting work efficient. Here, examples of the predetermined number include, but not limited to, 3, 5, and 10.

Figure 11:
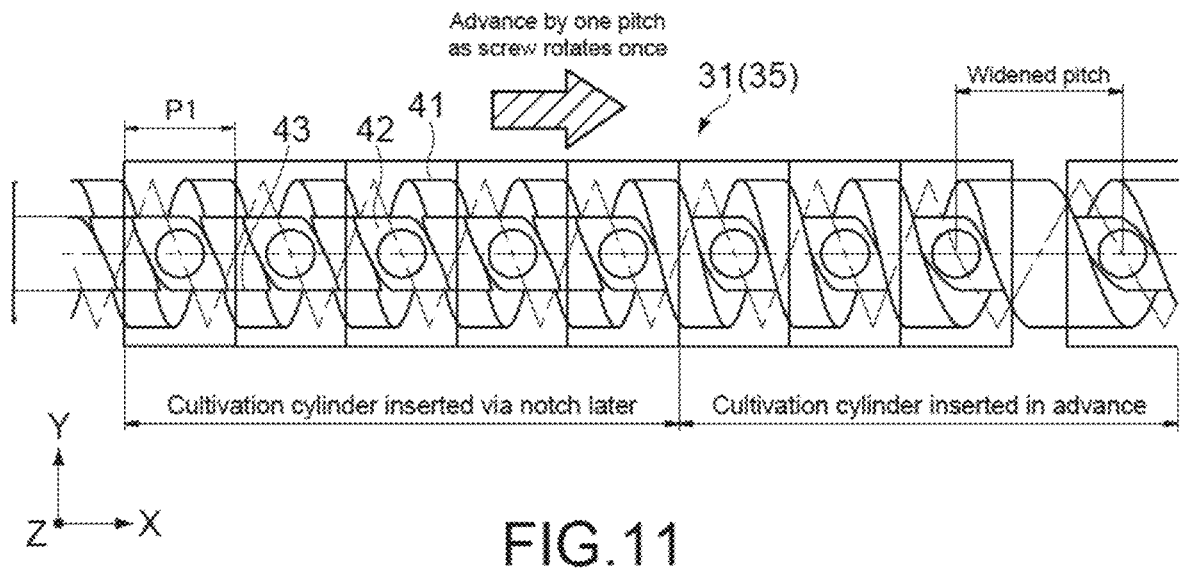
FIG. 11 is a partially enlarged side view of the screw member shown in FIG. 9.

Although described in FIG. 5, in each of the cultivation cylinders 1, the width in the transport direction of the roller members 15 and the horizontal frame member 14 holding the roller members 15 matches with the pitch P1 at the end portion of the screw 31 on the planting side (when the screw 31 rotates once, the cultivation cylinders 1 advance in the transport direction by the pitch P1) as shown in FIG. 11.

Accordingly, in the case where a plurality of (5 in the example of the figure) cultivation cylinders 1 are slidably inserted from the cutout 43 collectively, the worker is capable of positioning each of the cultivation cylinders 1 as it is in the groove 42 of the screw 31, and it is possible to omit unnecessary work for adjusting the position of the cultivation cylinder 1 and smoothly transport the cultivation cylinder 1 in the transport direction as it is.

Further, as described above, the pitch of the screw 31 is designed to be gradually (in a stepwise manner) increased from the planting side to the harvesting side. The (smallest) pitch on the planting side is, for example, 50 mm, and is increased in a stepwise manner therefrom to the harvesting side, e.g., to 100 mm, 150 mm, and 200 mm. The number of pitches having the same pitch matches with the number of cultivation cylinders 1 to be collectively planted on the planting side by the worker, and the number of cultivation cylinders 1 to be collectively harvested on the harvesting side, or may be an integral multiple of these numbers.

Figure 12:
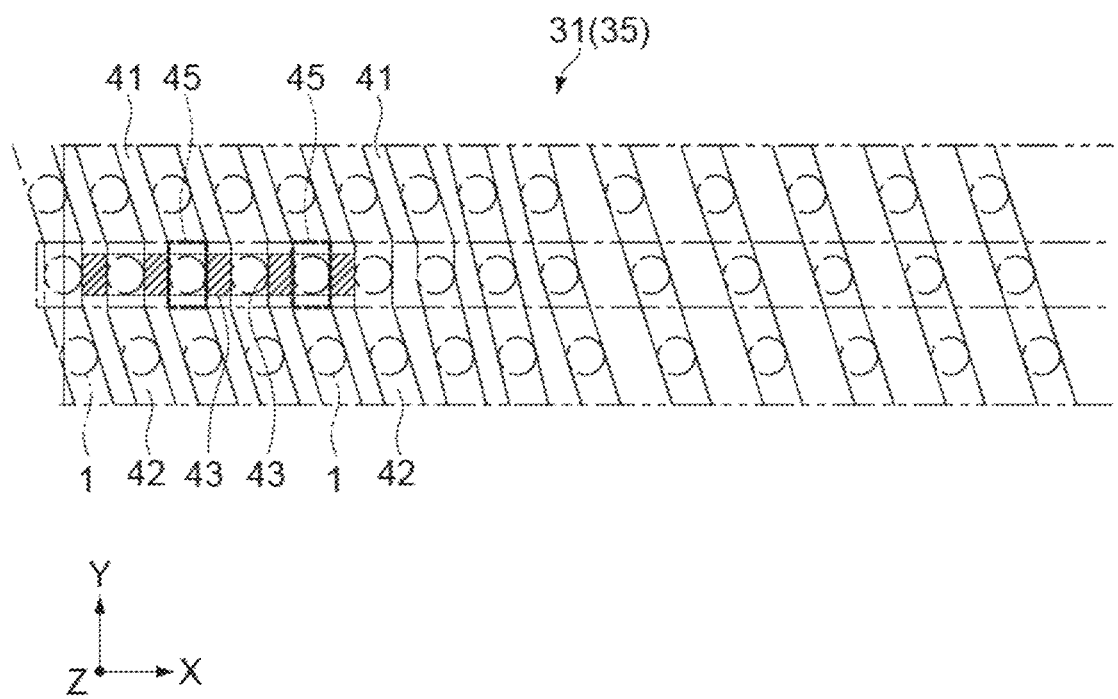
FIG. 12 is a schematic exploded view of the screw member shown in FIG. 9.

FIG. 12 is a schematic exploded view of the screw member 35 shown in FIG. 9.

As shown in the figure, the ridges 41 and the grooves 42 of the part on which the cutouts 43 are provided at the end portion of the screw members 35 on the planting side each include a stationary part 45. The stationary part 45 includes a stationary part 45 that regulates the transport of each of the cultivation cylinders 1 in the transport direction (X direction) and guides the cultivation cylinder 1 in a direction parallel to the rotation direction of the screw 31.

That is, the ridges 41 and the grooves 42 on the end portion on the planting side have such a shape that the spiral trajectory stops at a position slightly before the cutout 43, is corrected in the direction (Y direction) parallel to the rotation axis, and returns to the spiral trajectory again from the position slight after the cutout 43.

By providing the stationary part 45, it is possible to inhibit each cultivation cylinder inserted via the cutout 43 from being damaged by coming into contact with or being caught on the corner of the cutout 43 when the cultivation cylinder is moved with the rotation of the screw 31, and inhibit the damaged piece from falling onto the seedling V of the cultivation cylinder 1, i.e., the seedling V from being mixed with a foreign matter.

[Supply of Nutrient Solution Different for Each Region]

Figure 13:
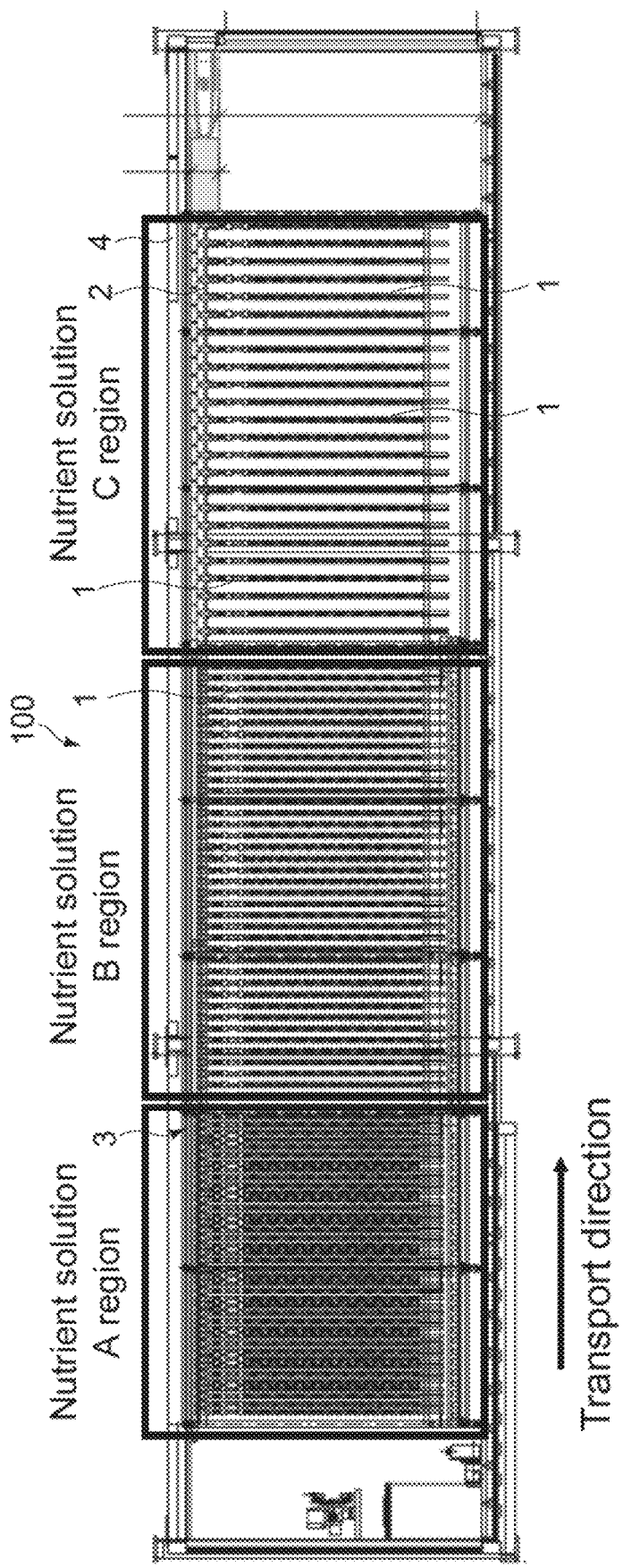
FIG. 13 is a diagram showing the state of the hydroponic cultivation system divided into regions for each supply nutrient solution.

In this embodiment, the hydroponic cultivation system 100 is capable of making the nutrient solution to be supplied to the seedling V of the cultivation cylinder 1 different for each region. FIG. 13 is a diagram showing the state of the hydroponic cultivation system 100 divided into regions for each supply nutrient solution.

As shown in the figure, the hydroponic cultivation system 100 is capable of supplying nutrient solutions (e.g., three different nutrient solutions in the case where the number of different pitches of the screw 31 is three) different for each region of the cultivation cylinder 1 having the same adjacent interval (i.e., pitch of the corresponding screw 31).

As described above, since the cultivation cylinders 1 is hanged in the vertical direction, the nutrient solution supplied from the nutrient supply pipe 8 via the nutrient receiving pipe 13 flows in the vertical direction at high speed in the cultivation cylinders 1. Therefore, even in the case of using nutrient solutions different for each region, the contamination of the nutrient solutions is suppressed as much as possible. Therefore, it is possible to maximize the effect of making the nutrient solution different for each region as compared with the case of using a horizontal seedbed.

Accordingly, the hydroponic cultivation system 100 is capable of supplying nutrient solutions having different components and concentrations according to the growth of the seedling V, and easily cultivating functional vegetables such as low potassium lettuce by, for example, replacing the previous nutrient solution with a nutrient solution having different components at a predetermined growth stage.

[Conclusion]

As described above, according to this embodiment, the hydroponic cultivation system 100 is capable of transporting the seedbeds with a simple mechanism by the transport mechanism 3 (one screw 31) horizontally transporting the vertical cultivation cylinders 1, which are hanged by the cultivation cylinder hanging part 2 and arranged in one column in the transport direction, as compared with the case of using horizontal seedbeds. Further, since the cultivation cylinder hanging part 2 hangs the cultivation cylinders 1, the transport mechanism 3 is not subjected to the weight of the cultivation cylinders 1. Therefore, it is possible to simplify the structure of the transport mechanism 3 and reduce the cost. Further, the nutrient supply pipe 8 is provided at the same position as that of the transport mechanism 3 in the height direction or at a position lower than that. Accordingly, since the transport mechanism 3 is not exposed to the nutrient solution and corroded, it is possible to improve the durability.

[Modified Example]

The present invention is not limited to only the above-mentioned embodiment, and various modifications can be made without departing from the essence of the present invention.

In the above-mentioned embodiment, the transport mechanism 3 includes the screw 31 whose pitch is increased in a stepwise manner. However, the transport mechanism 3 is not limited thereto. For example, as the transport mechanism 3, a link mechanism shown in FIG. 14 can be used.

Figure 14:
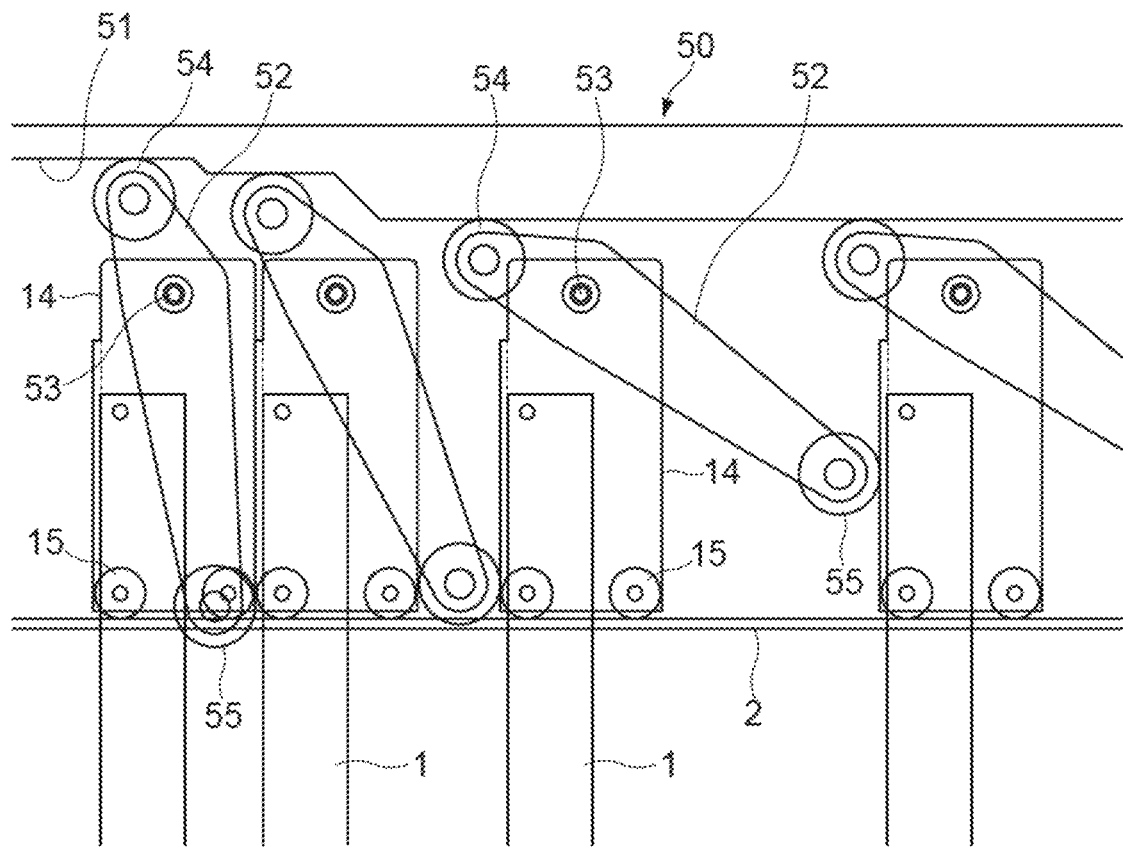
FIG. 14 is a diagram showing a modified example of the transport mechanism of the hydroponic cultivation system.
Figure 14:
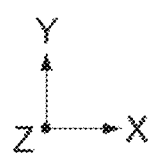

FIG. 14 is a schematic transparent side view of a link mechanism 50 as the transport mechanism 3. As shown in the figure, the link mechanism 50 includes a ceiling 51 and arm parts 52.

The arm parts 52 are each formed of, for example, a long rhombic plate member, and each include an upper roller 54 and a lower roller 55 capable of rotating around the Z direction at both ends thereof. Further, the arm part 52 is rotatably connected to the side surface of the horizontal frame member 14 of the cultivation cylinder 1 on, for example, the upper roller side via a spindle 53. The cultivation cylinder 1 includes the roller member 15 slidable on the cultivation cylinder hanging part 2, which is similar to that in the above-mentioned embodiment.

Further, the ceiling 51 is formed to have the height (distance between the ceiling 51 and the cultivation cylinder hanging part 2) that is reduced in a stepwise manner via the inclined surface.

With this configuration, when the cultivation cylinder 1 on the most plating side (left end in the figure) is moved in the transport direction (right side in the X direction), the lower roller 55 of the arm part 52 connected to the cultivation cylinder 1 pushes the preceding cultivation cylinder 1, thereby moving the plurality of cultivation cylinders 1 in the transport direction in conjunction with each other. In addition, since the height of the ceiling 51 is reduced in a stepwise manner, the position of the upper roller 54 is moved downward along therewith, and the arm part 52 rotates in the transport direction around the spindle 53, which moves the position of the lower roller 55 in the transport direction. Therefore, also the distance to the preceding cultivation cylinder 1 pushed by the lower roller 55 is increased as the height of the ceiling 51 is changed.

With such a configuration, similarly to the screw 31 having different pitches, it is possible to transport the cultivation cylinders 1 in the transport direction while widening spaces between the cultivation cylinders 1 in a stepwise manner.

In the above-mentioned embodiment, the roller member 15 as a slidable member has been provided on the upper part of each cultivation cylinder 1 (part supported by the cultivation cylinder hanging part 2). However, instead of being provided on the cultivation cylinder 1, the roller member may be provided on the cultivation cylinder hanging part 2.

Figure 15:
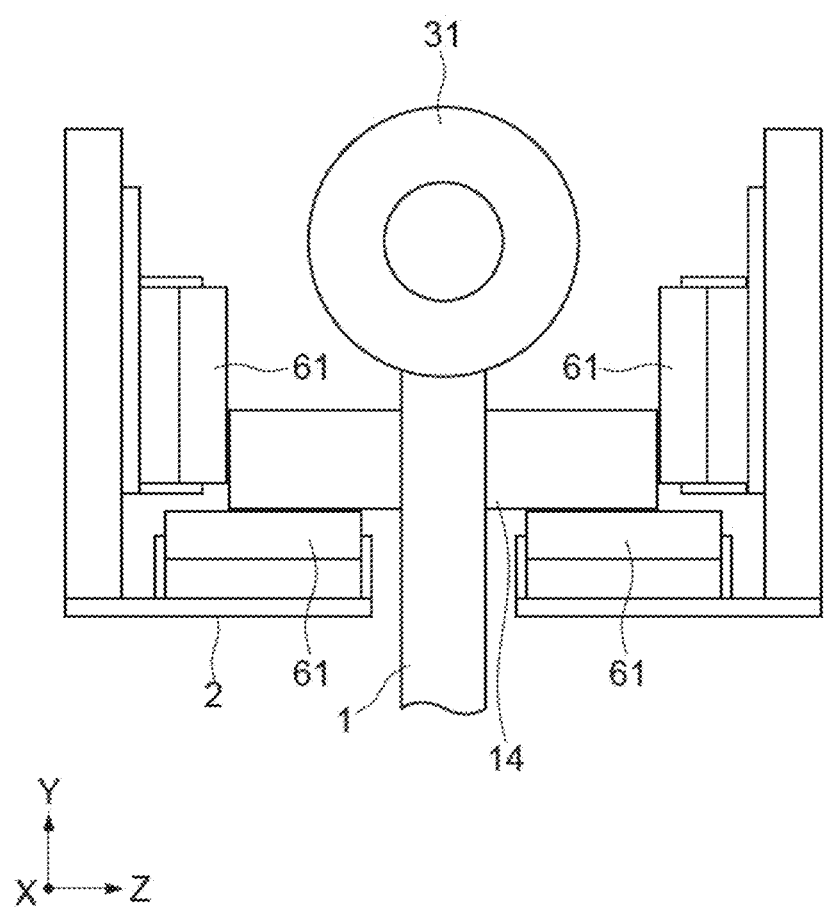
FIG. 15 is a diagram showing a modified example of the roller member shown in FIG. 4 and FIG. 5.

FIG. 15 is a diagram showing the configuration of the sliding mechanism from the transport direction in the case where the roller member is provided on the cultivation cylinder hanging part 2. As shown in the figure, on the bottom surface and side surface of the cultivation cylinder hanging part 2, a plurality of cylindrical wheels 61 (so-called mini-mini wheels) for sliding the horizontal frame member 14 of the cultivation cylinder 1 in the transport direction are provided. Many wheels 61 are provided adjacent to each other from the planting side to the harvesting side of the transport direction, and function as a wheel conveyor.

Each of the wheel 61 does not necessarily need to have a cylindrical shape, and a plurality of disc-shaped rollers may be connected to each other in the Z direction, thereby configuring the wheels 61. Further, in the figure, as the transport mechanism, the screw 31 is shown. Instead of the screw 31, the link mechanism 50 may be used.

Accordingly, it is possible to further simplify the structure of the cultivation cylinders 1, and improve the workability when planting the cultivation cylinders 1.

The length of the cutout 43 of the screw 31 in the above-mentioned embodiment is not limited to that shown in the figure, and may be the one capable of slidably inserting a larger number of cultivation cylinders 1 collectively. Further, also the length (area) of the stationary part 45 of the screw 31 is not limited to that shown in the figure, and may be appropriately changed.

Further, also the number of different pitches of the screw 31 is not limited to that shown in the above-mentioned embodiment, and may be appropriately changed. Further, in this case, also the number of different nutrient solutions used according to the number of pitches can be appropriately changed.

In the above-mentioned embodiment, as the seedbed to which the seedling is transplanted, the cultivation cylinder 1 has been shown. However, the seedbed does not necessarily need to have a cylindrical shape, and may be of any form as long as it is long, e.g., it may be a cylindrical foam (sponge or the like) capable of holding the seedling on the side surface or a rod-like body capable of hanging the seedling from the side surface.

In the above-mentioned embodiment, the nutrient solution has flown in the nutrient supply pipe 8 by the pump from the nutrient solution tank, and has been supplied to the reception port of the nutrient receiving pipe 13 of the cultivation cylinder 1 and then to the inside of the cultivation cylinder via the nutrient receiving pipe 13. However, instead of the nutrient supply pipe 8, a hole may be provided in the center of the screw 31 in the axial direction, and the nutrient solution may be supplied to each of the cultivation cylinders 1 through the hole of the screw 1.

REFERENCE SIGNS LIST 1 cultivation cylinder
2 cultivation cylinder hanging part
3 transport mechanism
4 strut frame 5 LED
7 daylighting apparatus
8 nutrient supply pipe
9 cultivation cylinder bottom guide
10 air conditioning duct
11 cultivation cylinder main body
12 planting branch pipe
13 nutrient receiving pipe
14 horizontal frame member
15 roller member
31 screw
32 coil spring
33 screw guide
35 screw member
36 connection key
37 screw shaft
41 ridge
42 groove
43 cutout
44 connection hole
44a large diameter portion
44b small diameter portion
45 stationary part
50 link mechanism
51 a ceiling
52 arm part
53 spindle
54 upper roller
55 lower roller
61 wheel
V seedling

The invention claimed is:

1. A hydroponic cultivation system, comprising:
a plurality of seedbeds configured to receive seedlings of a plant being transplanted to the seedbeds, wherein each seedbed of the plurality of seedbeds has a length, measured in a vertical direction, that is greater than a width, measured in a horizontal direction perpendicular to the vertical direction;
a hanging part that hangs each seedbed of the plurality of seedbeds while seedbeds of the plurality of seedbeds are arranged in the horizontal direction from a first side of the hydroponic cultivation system configured for planting the seedlings in the seedbeds to a second side of the hydroponic cultivation system configured for harvesting the seedlings from the seedbeds, wherein the plurality of seedbeds is initially arranged on the hanging part such that initial spacings are respectively present in the horizontal direction between adjacent seedbeds of the plurality of seedbeds; and
a transport mechanism that transports the plurality of seedbeds in the horizontal direction, from the first side of the hydroponic cultivation system to the second side of the hydroponic cultivation system, while widening the respective initial spacings either continuously or in a discrete manner,
wherein the transport mechanism includes one screw formed to have a pitch that is increased in a discrete manner toward the horizontal direction, the screw including grooves, and upper ends of the seedbeds of the plurality of seedbeds being configured to engage with the grooves, and
wherein end portions of ridges of the screw on the first side of the hydroponic cultivation system include cutouts that are configured for slidably inserting upper ends of a predetermined number of seedbeds of the plurality of seedbeds that are to be newly planted in the horizontal direction collectively and causing said seedbeds to engage with the grooves.

2. The hydroponic cultivation system according to claim 1, wherein each of the seedbeds of the plurality of seedbeds or the transport mechanism includes a sliding mechanism that slides the plurality of seedbeds in the horizontal direction at a time of transporting the plurality of seedbeds.

3. A hydroponic cultivation system, comprising:
a plurality of seedbeds configured to receive seedlings of a plant being transplanted to the seedbeds, wherein each seedbed of the plurality of seedbeds has a length, measured in a vertical direction, that is greater than a width, measured in a horizontal direction perpendicular to the vertical direction;
a hanging part that hangs each seedbed of the plurality of seedbeds while seedbeds of the plurality of seedbeds are arranged in the horizontal direction from a first side of the hydroponic cultivation system configured for planting the seedlings in the seedbeds to a second side of the hydroponic cultivation system configured for harvesting the seedlings from the seedbeds, wherein the plurality of seedbeds is initially arranged on the hanging part such that initial spacings are respectively present in the horizontal direction between adjacent seedbeds of the plurality of seedbeds; and
a transport mechanism that transports the plurality of seedbeds in the horizontal direction, from the first side of the hydroponic cultivation system to the second side of the hydroponic cultivation system, while widening the respective initial spacings either continuously or in a discrete manner,
wherein the transport mechanism includes one screw formed to have a pitch that is increased in a discrete manner toward the horizontal direction, the screw including grooves, and upper ends of the seedbeds of the plurality of seedbeds being configured to engage with the grooves,
wherein each seedbed of the plurality of seedbeds includes a roller member that slides, on the hanging part in the horizontal direction, the corresponding seedbed to a position hung by the hanging part at the time of transporting the seedbed, and
wherein the roller member has a width, measured in the horizontal direction, the width matching a pitch of an end portion of the screw on the first side of the hydroponic cultivation system.

4. The hydroponic cultivation system according to claim 1, wherein
ridges and grooves of a part of the screw in which the cutouts are provided include a stationary part that regulates transport of the seedbeds of the plurality of seedbeds in the horizontal direction and guides the seedbeds of the plurality of seedbeds in a direction parallel to a rotation direction of the screw.

5. A hydroponic cultivation system, comprising:
a plurality of seedbeds configured to receive seedlings of a plant being transplanted to the seedbeds, wherein each seedbed of the plurality of seedbeds has a length, measured in a vertical direction, that is greater than a width, measured in a horizontal direction perpendicular to the vertical direction;
a hanging part that hangs each seedbed of the plurality of seedbeds while seedbeds of the plurality of seedbeds are arranged in the horizontal direction from a first side of the hydroponic cultivation system configured for planting the seedlings in the seedbeds to a second side of the hydroponic cultivation system configured for harvesting the seedlings from the seedbeds, wherein the plurality of seedbeds is initially arranged on the hanging part such that initial spacings are respectively present in the horizontal direction between adjacent seedbeds of the plurality of seedbeds; and a transport mechanism that transports the plurality of seedbeds in the horizontal direction, from the first side of the hydroponic cultivation system to the second side of the hydroponic cultivation system, while widening the respective initial spacings either continuously or in a discrete manner, wherein the transport mechanism includes one screw formed to have a pitch that is increased in a discrete manner toward the horizontal direction, the screw including grooves, and upper ends of the seedbeds of the plurality of seedbeds being configured to engage with the grooves, wherein the screw includes a plurality of screw members each having a predetermined length and connection members each connecting two screw members, wherein connection holes are formed at both end portions of the screw members in a rotation axis direction of the screw, wherein the connection members each engage with the corresponding connection holes of the plurality of screw members, and wherein the transport mechanism includes:
  a screw supporting part that rotatably supports an end portion of the screw; and
  a biasing member that is provided between the screw supporting part and the screw, and biases the screw members in the rotation axis direction.

\* \* \* \* \*